(12) United States Patent
Cook et al.

(10) Patent No.: US 9,507,431 B2
(45) Date of Patent: *Nov. 29, 2016

(54) VIEWING IMAGES WITH TILT-CONTROL ON A HAND-HELD DEVICE

(71) Applicant: Apple Inc., Cupertino, CA (US)

(72) Inventors: Ralph Cook, Durham, NC (US); Anders L. Mölne, Cary, NC (US); Joseph A. Carsanaro, Chapel Hill, NC (US)

(73) Assignee: APPLE INC., Cupertino, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 14/670,276

(22) Filed: Mar. 26, 2015

(65) Prior Publication Data
US 2015/0199026 A1 Jul. 16, 2015

Related U.S. Application Data

(63) Continuation of application No. 12/449,182, filed as application No. PCT/US2008/000987 on Jan. 25, 2008, now Pat. No. 8,994,644.

(60) Provisional application No. 60/897,803, filed on Jan. 26, 2007.

(51) Int. Cl.
*G06F 3/01* (2006.01)
*G06F 1/16* (2006.01)
(Continued)

(52) U.S. Cl.
CPC ............ *G06F 3/017* (2013.01); *G06F 1/1613* (2013.01); *G06F 1/1637* (2013.01);
(Continued)

(58) Field of Classification Search
CPC .. G06F 1/1613; G06F 1/1637; G06F 1/1694; G06F 3/0485; G06F 2200/1637; G06F 2203/04806; G06F 3/017; G09G 2340/04; G09G 5/34; G06T 15/20; G06T 3/40; G06T 3/60
See application file for complete search history.

(56) References Cited

U.S. PATENT DOCUMENTS

| 4,720,703 A | 1/1988 | Schnarel, Jr. et al. |
| 4,786,897 A | 11/1988 | Takanashi et al. |

(Continued)

FOREIGN PATENT DOCUMENTS

| EP | 0429391 A1 | 5/1991 |
| EP | 0805389 A2 | 11/1997 |

(Continued)

OTHER PUBLICATIONS

Rekimoto, "Tilting Operations for Small Screen Interfaces," UIST '96, Proceedings of the ACM Symposium on User Interface Software and Technology, Seattle, Washington, Nov. 6-8, 1996, 3 pages.

(Continued)

*Primary Examiner* — Premal Patel
(74) *Attorney, Agent, or Firm* — Morgan, Lewis & Bockius LLP

(57) ABSTRACT

A user interface suitable for use in cellular phones and personal digital assistants (PDAs), PC Tablets, as well as laptops, PCs, office equipment, medical equipment, or any other hand-held electronic device, that allows control of the image on the device display by tilting the device to either change the view in perspective, change the magnification, or both, concurrently, by moving the device. Thus, the tilt of the device controls the angle of view of the image, and moving the device perpendicular to the screen controls the magnification.

30 Claims, 7 Drawing Sheets

(51) Int. Cl.
    *G06F 3/0485*     (2013.01)
    *G06T 3/40*     (2006.01)
    *G06T 3/60*     (2006.01)
    *G06T 15/20*     (2011.01)
    *G09G 5/34*     (2006.01)

(52) U.S. Cl.
    CPC .......... *G06F 1/1694* (2013.01); *G06F 3/0485* (2013.01); *G06T 3/40* (2013.01); *G06T 3/60* (2013.01); *G06T 15/20* (2013.01); *G09G 5/34* (2013.01); *G06F 2200/1637* (2013.01); *G06F 2203/04806* (2013.01); *G09G 2340/04* (2013.01)

(56) References Cited

U.S. PATENT DOCUMENTS

| | | | |
|---|---|---|---|
| 4,787,051 A | | 11/1988 | Olson |
| 5,367,614 A | * | 11/1994 | Bisey .................. G01S 5/186 345/156 |
| 5,463,725 A | | 10/1995 | Henckel et al. |
| 5,526,481 A | | 6/1996 | Parks et al. |
| 5,602,566 A | | 2/1997 | Motosyuku et al. |
| 6,115,025 A | | 9/2000 | Buxton et al. |
| 6,151,208 A | | 11/2000 | Bartlett |
| 6,157,368 A | | 12/2000 | Fäger |
| 6,201,554 B1 | * | 3/2001 | Lands .................. G06F 1/1626 345/156 |
| 6,375,572 B1 | | 4/2002 | Masuyama et al. |
| 6,400,376 B1 | | 6/2002 | Singh et al. |
| 6,466,198 B1 | * | 10/2002 | Feinstein ............. G06F 1/1626 345/158 |
| 6,489,945 B1 | | 12/2002 | Gordon |
| 6,552,713 B1 | | 4/2003 | Van Brocklin et al. |
| 6,567,101 B1 | | 5/2003 | Thomas |
| 6,577,296 B2 | | 6/2003 | Flack |
| 6,603,485 B2 | | 8/2003 | Forman |
| 6,624,824 B1 | | 9/2003 | Tognazzini et al. |
| 6,690,358 B2 | | 2/2004 | Kaplan |
| 6,765,443 B2 | | 7/2004 | Pehike |
| 6,765,553 B1 | | 7/2004 | Odamura |
| 6,797,937 B2 | | 9/2004 | Norskog et al. |
| 6,834,249 B2 | | 12/2004 | Orchard |
| 6,872,931 B2 | | 3/2005 | Liess et al. |
| 6,933,923 B2 | | 8/2005 | Feinstein |
| 6,937,140 B1 | | 8/2005 | Outslay et al. |
| 6,939,231 B2 | | 9/2005 | Mäntyjärvi et al. |
| 6,977,675 B2 | | 12/2005 | Kotzin |
| 6,995,746 B2 | | 2/2006 | Aymeric |
| 7,034,803 B1 | | 4/2006 | Reiffel |
| 7,058,432 B2 | | 6/2006 | Nishimoto |
| 7,100,123 B1 | | 8/2006 | Todd et al. |
| 7,124,374 B1 | | 10/2006 | Haken |
| 7,138,979 B2 | | 11/2006 | Robin et al. |
| 7,159,172 B1 | | 1/2007 | Bentley et al. |
| 7,162,268 B2 | | 1/2007 | Koyama |
| 7,164,411 B2 | | 1/2007 | Keränen et al. |
| 7,184,025 B2 | | 2/2007 | Williams et al. |
| 7,194,702 B1 | | 3/2007 | Peasley |
| 7,194,816 B2 | | 3/2007 | Tamura |
| 7,242,391 B2 | | 7/2007 | Lin et al. |
| 7,271,795 B2 | | 9/2007 | Bradski |
| 7,289,102 B2 | | 10/2007 | Hinckley et al. |
| 7,301,528 B2 | | 11/2007 | Marvit et al. |
| 7,302,280 B2 | | 11/2007 | Hinckley et al. |
| 7,315,751 B2 | | 1/2008 | Kurakane |
| 7,567,818 B2 | | 7/2009 | Pylkko |
| 7,601,066 B1 | | 10/2009 | Masuyama et al. |
| 7,607,111 B2 | | 10/2009 | Vaananen et al. |
| 7,679,604 B2 | | 3/2010 | Uhlik et al. |
| 7,688,306 B2 | | 3/2010 | Wehrenberg et al. |
| 7,721,968 B2 | | 5/2010 | Wigdor |
| 7,827,698 B2 | | 11/2010 | Jaiswal et al. |
| 7,848,542 B2 | | 12/2010 | Hildreth |
| 7,859,553 B2 | | 12/2010 | Bae |
| 8,099,124 B2 | | 1/2012 | Tilley |
| 8,164,640 B2 | | 4/2012 | Vartiainen et al. |
| 8,230,610 B2 | | 7/2012 | Jaiswal et al. |
| 8,355,031 B2 | | 1/2013 | Hinterberger et al. |
| 8,502,775 B2 | | 8/2013 | Orchard et al. |
| 2002/0052209 A1 | | 5/2002 | Frohlund |
| 2002/0126136 A1 | | 9/2002 | Lin |
| 2002/0175896 A1 | | 11/2002 | Vaananen et al. |
| 2002/0180733 A1 | * | 12/2002 | Colmenarez ............. G06T 3/00 345/427 |
| 2003/0001863 A1 | | 1/2003 | Davidson et al. |
| 2003/0126100 A1 | | 7/2003 | Chithambaram |
| 2003/0234797 A1 | | 12/2003 | Williams et al. |
| 2004/0012566 A1 | | 1/2004 | Bradski |
| 2004/0196259 A1 | | 10/2004 | Bradski |
| 2004/0204067 A1 | | 10/2004 | Kurakane |
| 2005/0208978 A1 | | 9/2005 | Pylkko |
| 2006/0129951 A1 | | 6/2006 | Vaananen et al. |
| 2006/0146009 A1 | | 7/2006 | Syrbe et al. |
| 2006/0152710 A1 | | 7/2006 | Braunecker et al. |
| 2006/0192759 A1 | * | 8/2006 | Adams .................. G06F 3/0213 345/163 |
| 2007/0205980 A1 | | 9/2007 | Dijk |
| 2008/0030360 A1 | | 2/2008 | Griffin |
| 2009/0016606 A1 | | 1/2009 | Meyer et al. |
| 2009/0297062 A1 | | 12/2009 | Molne et al. |
| 2009/0303204 A1 | | 12/2009 | Nasiri et al. |
| 2009/0305727 A1 | | 12/2009 | Pylkko |
| 2009/0313584 A1 | | 12/2009 | Kerr et al. |
| 2010/0020102 A1 | | 1/2010 | Vaananen et al. |
| 2010/0125818 A1 | | 5/2010 | Vaananen et al. |
| 2010/0153891 A1 | | 6/2010 | Vaananen et al. |
| 2010/0171691 A1 | | 7/2010 | Cook et al. |
| 2011/0283223 A1 | | 11/2011 | Vaittinen et al. |

FOREIGN PATENT DOCUMENTS

| | | |
|---|---|---|
| GB | 2336747 A | 10/1999 |
| JP | 10011249 A | 1/1998 |
| JP | 2000259856 A | 9/2000 |
| WO | WO 98/11528 | 3/1998 |
| WO | WO 98/14863 | 4/1998 |
| WO | WO 99/18495 | 4/1999 |
| WO | WO 99/22338 | 5/1999 |
| WO | WO 99/32960 | 7/1999 |
| WO | WO 01/78055 A1 | 10/2001 |

OTHER PUBLICATIONS

Office Action, dated Mar. 24, 2005, received in U.S. Appl. No. 10/071,172, 11 pages.

Office Action, dated Oct. 3, 2008, received in U.S. Appl. No. 11/159,786, 10 pages.

Notice of Allowance, dated Jun. 15, 2009, received in U.S. Appl. No. 11/159,786, 6 pages.

Office Action, dated Feb. 8, 2012, received in U.S. Appl. No. 12/569,797, 12 pages.

Final Office Action, dated Jul. 17, 2012, received in U.S. Appl. No. 12/569,797, 12 pages.

Office Action, dated Jan. 23, 2013, received in U.S. Appl. No. 12/691,506, 16 pages.

Office Action, dated Aug. 5, 2013, received in U.S. Appl. No. 12/691,506, 21 pages.

Office Action (Examiner's Answer), dated Jul. 23, 2014, received in Patent Application No. 12/691,506, 28 pages.

Office Action, dated Jun. 20, 2012, received in U.S. Appl. No. 12/710,944, 7 pages.

Final Office Action, dated Mar. 18, 2013, received in U.S. Appl. No. 12/710,944, 14 pages.

Office Action, dated Aug. 7, 2007, received in U.S. Appl. No. 10/530,004, 15 pages.

Final Office Action, dated Feb. 11, 2008, received in U.S. Appl. No. 10/530,004, 13 pages.

Office Action, dated May 28, 2008, received in U.S. Appl. No. 10/530,004, 9 pages.

(56) References Cited

OTHER PUBLICATIONS

Final Office Action, dated Dec. 2, 2008, received in U.S. Appl. No. 10/530,004, 10 pages.
Office Action, dated Aug. 18, 2009, received in U.S. Appl. No. 10/530,004, 11 pages.
Office Action, dated Jan. 23, 2012, received in U.S. Appl. No. 12/449,182, 14 pages.
Final Office Action, dated May 8, 2012, received in U.S. Appl. No. 12/449,182, 15 pages.
Office Action, dated Oct. 6, 2005, received in U.S. Appl. No. 10/110,400, 10 pages.
Office Action, dated Jul. 25, 2003, received in Chinese Patent Application No. 00814214.9, which corresponds with U.S. Appl. No. 10/110,400, 2 pages.
Finnish Search Report, dated Apr. 23, 2002, received in Finnish Patent Application No. 20011039, 1 page.
International Search Report, dated May 6, 2002, received in International Patent Application No. PCT/FI2002/000095, which corresponds with U.S. Appl. No. 10/071,172, 3 pages.
International Search Report and Written Opinion, dated Jun. 24, 2008, received in International Patent Application No. PCT/US2008/000987, which corresponds with U.S. Appl. No. 12/449,182, 5 pages.
International Preliminary Report on Patentability, dated Jul. 28, 2009, received in PCT/US2008/000987, which corresponds with U.S. Appl. No. 12/449,182, 5 pages.
Final Office Action, dated Mar. 31, 2010, received in U.S. Appl. No. 10/530,004, 12 pages.
Office Action, dated Oct. 3, 2013, received in U.S. Appl. No. 12/449,182, 18 pages.
Final Office Action, dated Jun. 3, 2014, received in U.S. Appl. No. 12/449,182, 22 pages.
Notice of Allowance, dated Nov. 21, 2014, received in U.S. Appl. No. 12/449,182, 9 pages.

\* cited by examiner

VIEWING IMAGES WITH TILT-CONTROL ON A HAND-HELD DEVICE

RELATED APPLICATIONS

This application is a continuation of U.S. patent application Ser. No. 12/449,182, filed Jan. 7, 2010, which is a National Stage of International Application No. PCT/US2008/000987, filed Jan. 25, 2008, which claims the benefit of U.S. Provisional Application No. 60/897,803, filed Jan. 26, 2007. All of these applications are incorporated by reference in their entireties.

TECHNICAL FIELD

The present invention relates to user interfaces for hand-held electronic devices with displays and, more particularly, to a user interface that allows control of the image on the device display by tilting the device. The user interface is suitable for use in cellular phones and personal digital assistants (PDAs), PC Tablets, as well as laptops, PCs, office equipment, medical equipment, or any other hand-held electronic device with a user interface that includes the viewing of documents, pictures, maps, or similar images.

BACKGROUND

An item displayed on a computer screen may be considered a projection of an actual object; for instance, a displayed document can be thought of as a projection of an actual document, where the display shows one page, several pages, or part of a page at a time.

There are several conventional techniques for allowing a user to "scroll" a displayed image so that the user can see one portion and then move to the next (or some other) portion to see. There are also standard ways to "zoom" the display in and out, so that a user can either see all (e.g., an entire page or several pages at once), or only a portion (of one page), depending on what he wants to see and the size of his display screen. Almost all conventional methods and devices have separate controls for zooming and for scrolling.

Scrolling is not limited to documents inasmuch as pictures of objects, maps, etc. may all be displayed in a similar fashion. Thus, scrolling and zooming are the standard terms used for specific operations to look at different parts of a display regardless of what kind of image is displayed.

Hand-held devices are more limited in the amount of screen space they provide; such devices are meant to be carried on one's person, and therefore cannot be larger or heavier than allowed by portability restrictions. Scrolling and zooming are therefore even more important on hand-held devices than on larger computers, because so many more images, documents, etc., have to be viewed "one part at a time" on hand-held devices.

Some hand-held devices are now capable of detecting the amount that they are tilted with respect to vertical, and allow the user to control various features on the device by tilting it. Scrolling and cursor movement are already controllable in this way (e.g., Hitachi U.S. Pat. No. 5,602,566). However, the '566 patent merely uses tilt to allow users to choose which portions of an image appear on the hand-held display. Thus with traditional scrolling, the user can change the portion of image under view but cannot change the magnification or perspective of the image.

Other references use tilt for zooming, such as U.S. Pat. No. 6,201,554 to Ericsson, which allows zoom control by the user through movement of a hand-held device.

The motion-sensitive controls of the current invention provide a user interface that is more natural than current common controls because it allows a user to see more of an image at one time than traditional scrolling, viewing it in perspective so that he can relate new portions in view with portions that were in view already, and doing so with perspective views with which the user is already familiar. In addition, the motion-sensitive control simultaneously allows the user to change the magnification of the image using movements that are compatible with the tilt movements.

A variety of hardware based solutions for motion sensing exist today, all of which have drawbacks. The most common motion sensor used in handheld devices is the accelerometer. Typically the accelerometers measure the force of inertia caused by linear acceleration, combined with the gravitational acceleration at the point being measured.

Given a single axis force reading from an accelerometer, it is impossible to differentiate between gravitation and inertia. This separation problem is one of the weaknesses of an accelerometer-only solution. Many handheld devices are now shipping with three-axis MEMS accelerometers, which partially address this issue. A three axis accelerometer that is not moving will measure a total of about 1 G of force across its three axes. By measuring and comparing force across these three axes, we can make certain inferences about the orientation and position of the device, but only if we make certain assumptions. If we assume that the device can rotate freely but not accelerate, we can approximate its orientation with respect to a horizontal plane. If we assume that the device can accelerate but not rotate, we can approximate its linear acceleration, and therefore its 3D spatial position. If we assume that the device can rotate freely, and can only accelerate vertically, we can approximate both its orientation and its linear acceleration along the gravity vector. In practice, however, handheld devices typically rotate freely around all three axes, and move freely along all three axes, making it impossible to accurately model both the real world position and orientation of the device.

In addition to the gravitational/inertial separation problem, accelerometers suffer from an inability to detect rotation around the force vector. So, for example, a motion application that depended on measuring rotation of a stationary device around the device's Y axis would work quite well when the device is horizontal, would become less accurate as the angle between the Y axis and the horizontal plane increases, and would become unpredictable as the Y axis becomes aligned vertically with the gravity vector.

Because of these drawbacks, most devices that include accelerometers must make assumptions about how they'll be used, and must accept or work around the flaws inherent to this technology.

Future devices will likely combine both gyroscopes and accelerometers to form Inertial Measurement Units (IMU), which allow measurement of both rotation and linear acceleration. Gyroscopes can measure changes in orientation, but not position. This can be used to subtract the gravitational component from the accelerometer measurement, leaving only inertial force due to linear acceleration. Today, however, gyroscopes are too expensive to include in most consumer handheld devices such as mobile phones.

Many mobile devices lack motion sensing hardware, but include digital cameras that can take motion video, typically at a rate of 15 to 30 frames per second. On some devices, these cameras have been used as a sort of crude motion sensor. By comparing the overlap between consecutive frames of video, it is possible to approximate the change in orientation, assuming a relatively fixed device position and a stationary background with sufficiently high contrast. This optical solution was popular when accelerometers were more expensive, since it worked on existing devices without requiring new hardware, but ongoing price reductions in MEMS accelerometers, combined with the optical solutions high power consumption, low accuracy, and environmental constraints are increasingly leading today's manufacturers toward accelerometer-based solutions.

The user interface methods described in the current invention can be implemented, with certain limitations, using a pure accelerometer, or pure optical based sensor solution. The accuracy and responsiveness of these user interface methods could be improved by including a gyroscope, but this option is too expensive, as discussed above. Therefore, the current invention proposes the novel approach of combining accelerometer measurements with optical measurements of relative orientation to overcome the weaknesses of each individual technology, thereby improving the performance of the user interface methods described herein.

SUMMARY

Accordingly, it is an object of the present invention to provide a motion-sensitive display solution suitable for sellers of portable electronic devices and the software for such devices including cellular phones and personal digital assistants (PDAs), PC Tablets, as well as laptops, PCs, office equipment, medical equipment, or any other hand-held electronic device that would benefit from a viewing method that allows the user to see more of the display than is normally allowed by scrolling.

It is another object to provide a motion sensitive display that allows a user to view an image more naturally than current methods, providing for perspective viewing of more of the image at one time than is available by scrolling alone.

It is another object to provide a way for the user, once he has tilted his viewed image, to cause the entire perspective-correct display to "scroll" in a given direction without having to use another control on the device.

It is another object to combine the control of the portion of the image being viewed and its magnification both with motions of the device, instead of forcing the user to use different controls for these two related operations.

It is another object to provide a motion sensitive display as above that is a turnkey solution for sellers of handheld devices and handheld device software, ready to be integrated into an overall product design without disrupting the existing cost or form factor of the device.

It is another object to define a way of "perspective centering" with a user-interface, e.g., altering a perspective view so that, after the user has adapted a new perspective, the user can then center the current view on a desired center-point while maintaining that new perspective. For example, if a user used a camera viewfinder to look at a large cliff face, turned the camera to obliquely look at a point on the cliff face not directly in front of him, and then walked over directly in front of the point to view it head-on with the point centered in the field of view, these efforts equate to "perspective centering" according to the current invention.

It is another object to define a way of "orbiting" with a user interface, e.g., allowing a user to change perspective as if the device were orbiting around a three-dimensional object, and seeing what he would if he actually moved his viewpoint in that way.

These and other objects are accomplished herein by a method and system that gives users a way of choosing which portions of an image appear on a hand-held display (using the tilt of the device to control the display), and concurrently allows the user to change the perspective of the image being viewed. The present system includes hardware and software that senses the direction and amount of tilt, and of movement of the device in space (i.e., when the user moves the device), and interprets how much the device is tilted and the direction and amount of the movement. The hardware may include accelerometer(s) that measure the force of gravitation combined with the force of inertia along orthogonal axes, gyroscope(s) to measure changes in tilt, and/or optical solutions which approximate relative orientation changes based on the overlap observed in consecutive frames of video. These technologies may be used in combination to complement each other and compensate for the weaknesses and blind spots inherent in each technology. In particular, the current invention proposes the novel use of the optical solution in combination with a three axis accelerometer to overcome the accelerometer's inability to measure rotation around the gravity vector, as well as its inability to model simultaneous changes in both position and orientation.

In order to use the current invention, the user places the device in "tilt control mode" by starting a particular program, pressing a button, inputting a command, or by any other means for indicating that the control of image display is to be controlled by the tilt actions of the user. Once in tilt control mode, the current invention defines movements of the entire hand-held device to control the perspective of view of the virtual object represented on the display. In this mode, when the user moves the device, the view on the display moves, and when the user tilts the device the view on the display of the device shifts so that the image is displayed at an angle related to the tilt angle. The net visual effect is similar to looking at an object through a camera while viewing a display on the back of the camera; the image being viewed changes, and the perspective of the image also changes. If the camera were looking straight down at a large document on a table, and the user turned the camera, the user would be able to see more of the document in the direction turned, and portions of the document in the new view would appear further away from the camera than other portions.

The tilt angle may not be directly, or linearly, related to the viewing angle. The tilt angle affects how the user looks at the screen, and it may be useful to have the viewing angle change more or less than the tilt angle depending on usability factors.

The present invention is especially useful in conjunction with zooming, which can also be controlled by the user through movement of the hand-held device. The resulting combination of zooming movement and panning movement allows the user to view, choose, and zoom quickly on whatever portion of the view he wants to see in more detail, as opposed to current technology which requires the user to first zoom to some level of detail, then use a different control to change the view to that part of the image he wants to see. The current invention effectively allows the user to move the device to either change the view, change the magnification, or both. This eliminates the need for separate controls for the scrolling and magnification changes.

The view of the image on the present device has one tilt angle with no perspective distortions (also called the "head-on" view). However, a tilt-command allows the user to change the perspective so that a different part of the image resides in the center of the view, while outlying image portions are displayed with perspective distortions. In combination with device movement controlling magnification, the user can "zoom back" to see more of the image than was currently displayed, tilt the device to view and center on some portion of the image not currently in view, "zoom in" to magnify the portion of interest, and then "center" the view so that the newly magnified portion has no perspective distortions.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION

The present invention is a motion-sensitive display solution suitable for sellers of portable electronic devices and the software for portable electronic devices such as cellular phones and personal digital assistants (PDAs), PC Tablets, as well as laptops, PCs, office equipment, medical equipment, or any other hand-held electronic device requiring a user-interface that more closely replicates natural human perception using perspective viewing instead of traditional scrolling.

The motion-sensitive display provides a user interface that is more attuned to human visual perception because it allows a user to scroll an image while simultaneously using the tilt to vary the perspective of the image. Thus, the tilt of the device controls the display not only for conventional scrolling and zooming to change the portion being viewed, but also to change the perspective of the image being viewed by providing finer details for a particular portion of the display but lesser details for other portions.

Figure 1:
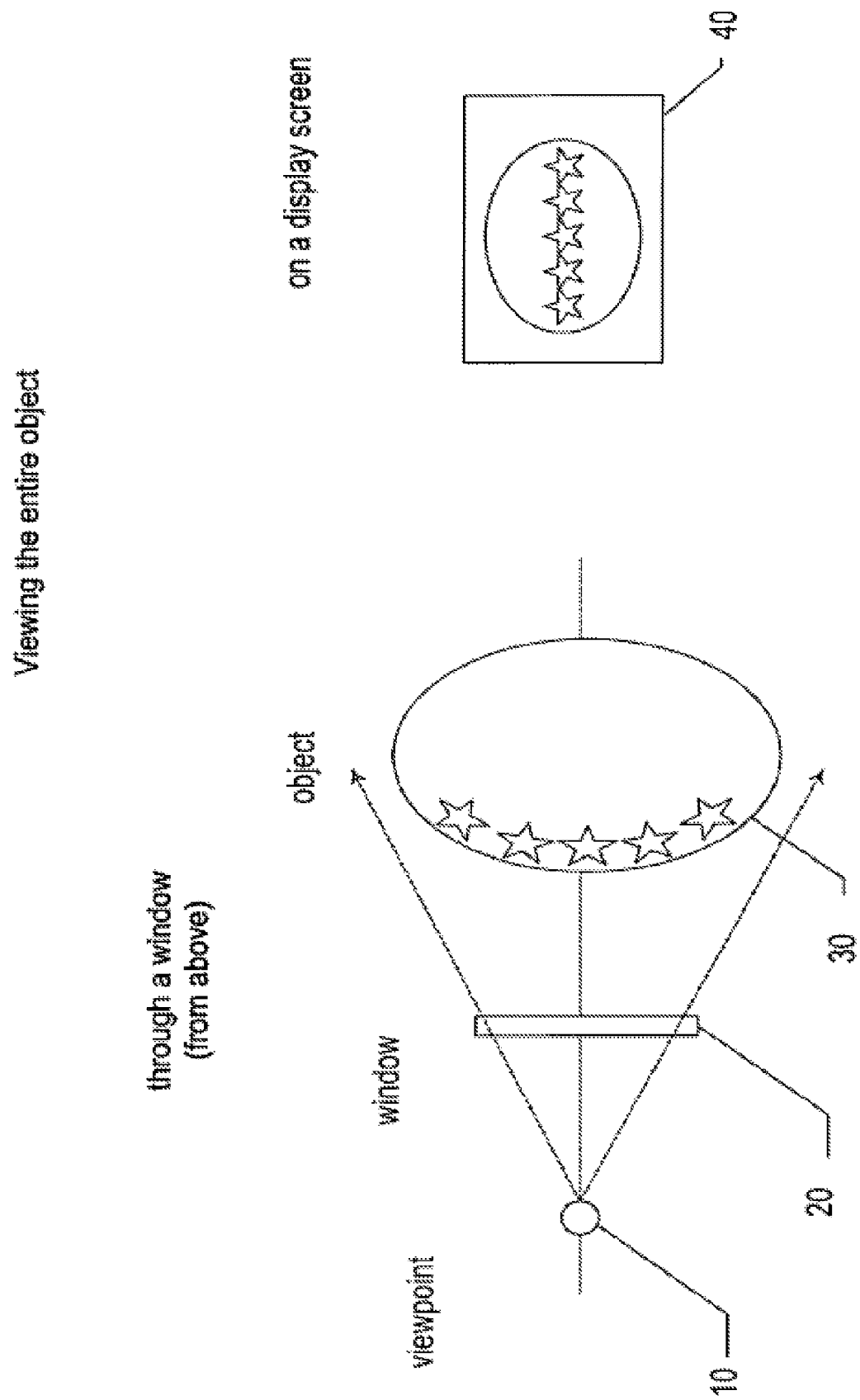
FIG. 1 shows the viewing of an object in two ways: how a person at a particular viewpoint would view the object through a window, and a rectangle that represents a screen showing what that person would see.

FIG. 1 is a perspective diagram showing the viewing of an object 30 from two different perspectives: (1) how a person at a particular viewpoint 10 would view the object 30 through a window 20, and (2) a rectangle that represents a screen 40 showing what that person would see.

In this three-dimensional actual view of an object through a window, the illustrated positions of the viewpoint 10, window 20, and object 30 allow a person to see all of the object 30. On the right is a representation of a hand-held device screen 40 which is a two-dimensional virtual view of the same object through a window, as if the virtual object 30 were being viewed from the same perspective as at left.

Figure 2:
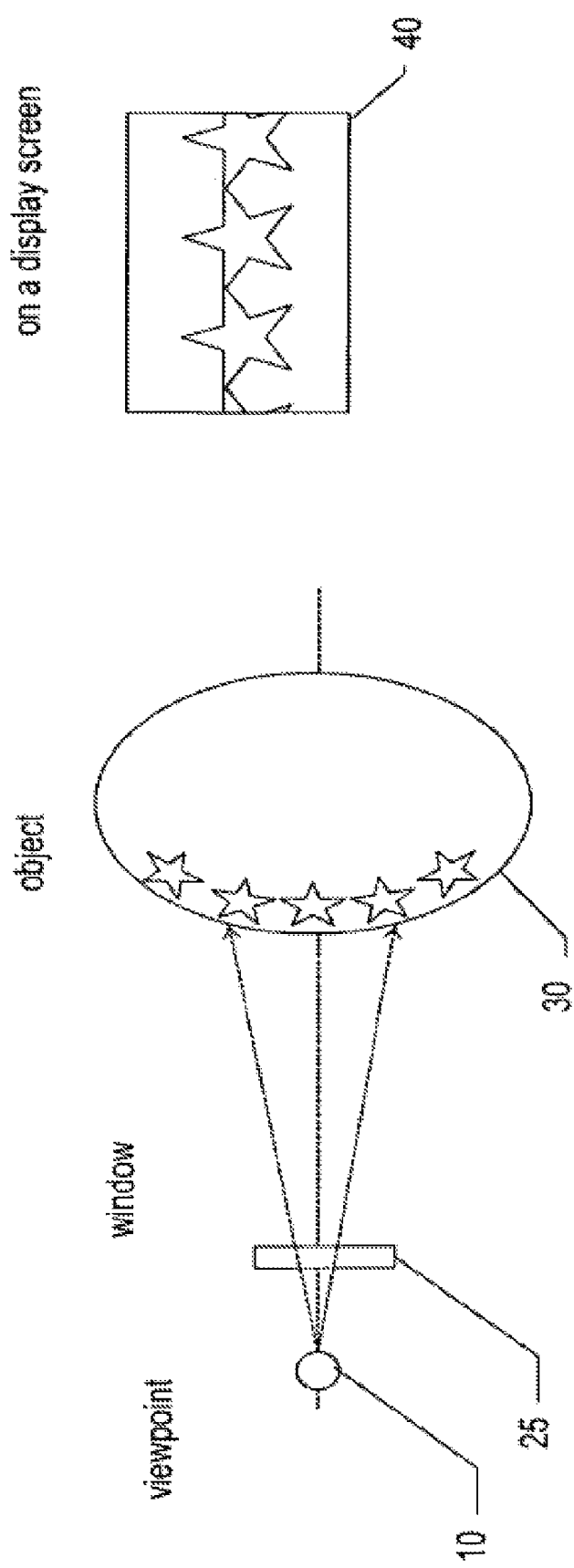
FIG. 2 shows the same two perspectives as FIG. 1, but with the person using a hand magnifying glass.

FIG. 2 shows the same three-dimensional actual perspective of an object 30 through a window, and two-dimensional virtual perspective as FIG. 1, but with the person using a hand magnifying glass 25. In the pair of views of FIG. 2, the left view illustrates someone looking through a hand-held magnifier 25 at the object; and it is readily apparent that moving the magnifier 25 closer to the object 30 will decrease the magnification, and further away will increase the magnification. The right view shows a representation of a hand-held device screen 40 showing what the virtual image of the object 30 might look like under a magnified view.

In accordance with the present invention, handheld devices such as cellular phones and personal digital assistants (PDAs), PC Tablets, as well as laptops, PCs, office equipment, medical equipment, or any other hand-held electronic device with a display screen, incorporate a user-interface, software, and motion-sensing hardware that allows movement of the hand-held device to control the magnification of the object being viewed as if the user were controlling a magnifying glass or camera, as above. The user of the hand-held device simply places the handheld device into a "tilt mode" in which it accepts motion commands. If the user then moves the device in a line perpendicular to its screen and closer to the user, the software interprets the motion as indicating greater magnification to the software, and the opposite motion as lesser magnification.

One skilled in the art will readily understand that the same functionality can be attained by interpreting reverse motions, e.g., moving the device "down" as though closer to the image will cause the magnification to increase, and vice versa for "away." Such reverse interpretation might be more natural for some users and for some situations, and the current invention is not restricted to one interpretation or the other.

Figure 3:
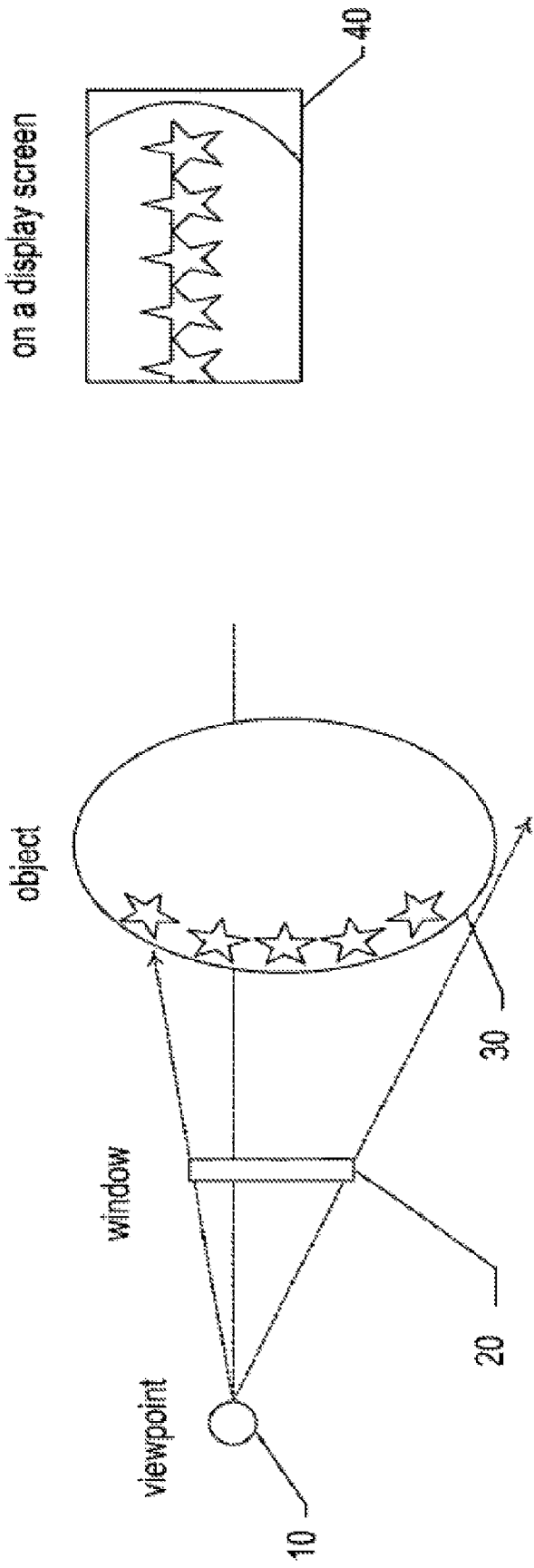
FIG. 3 shows the same two perspectives as 1 and 2, but with the viewpoint altered off-center from the alignment of the middle of the window and object. The result is that the view shows all of one side of the object, and less of the other side.

FIG. 3 shows the same two perspectives as FIGS. 1 and 2, but with the angle of the field of view off-center from where it was in FIG. 1. The result is that the view shows all of one side of the object 30, and less of the other side. The net effect is similar to looking at the object in the LCD viewscreen display of a digital camera at such a magnification and distance that not all of the object will fit on the camera viewscreen at the same time. In order to view different parts of the object 30, the user simply turns the camera. Similarly, in order to view different parts of the virtual image to the right of FIG. 3 using motion control according to the present invention, the user simply tilts the handheld device as he would a camera. The actual 3-D view of FIG. 3 (left) shows the camera turned to show the right portion of the object, and the right-side virtual view illustrates a hand-held screen 40 with the same viewpoint. In both cases from this perspective the right-hand side of the object 30 appears further away from the viewpoint 10 than the left-hand side. Thus, the tilt of the present handheld device is interpreted like the motion of a camera that causes the display software to change the viewing perspective. In part, this requires a conventional handheld electronic device architecture, with addition of one or more motion-sensing devices.

Figure 4:
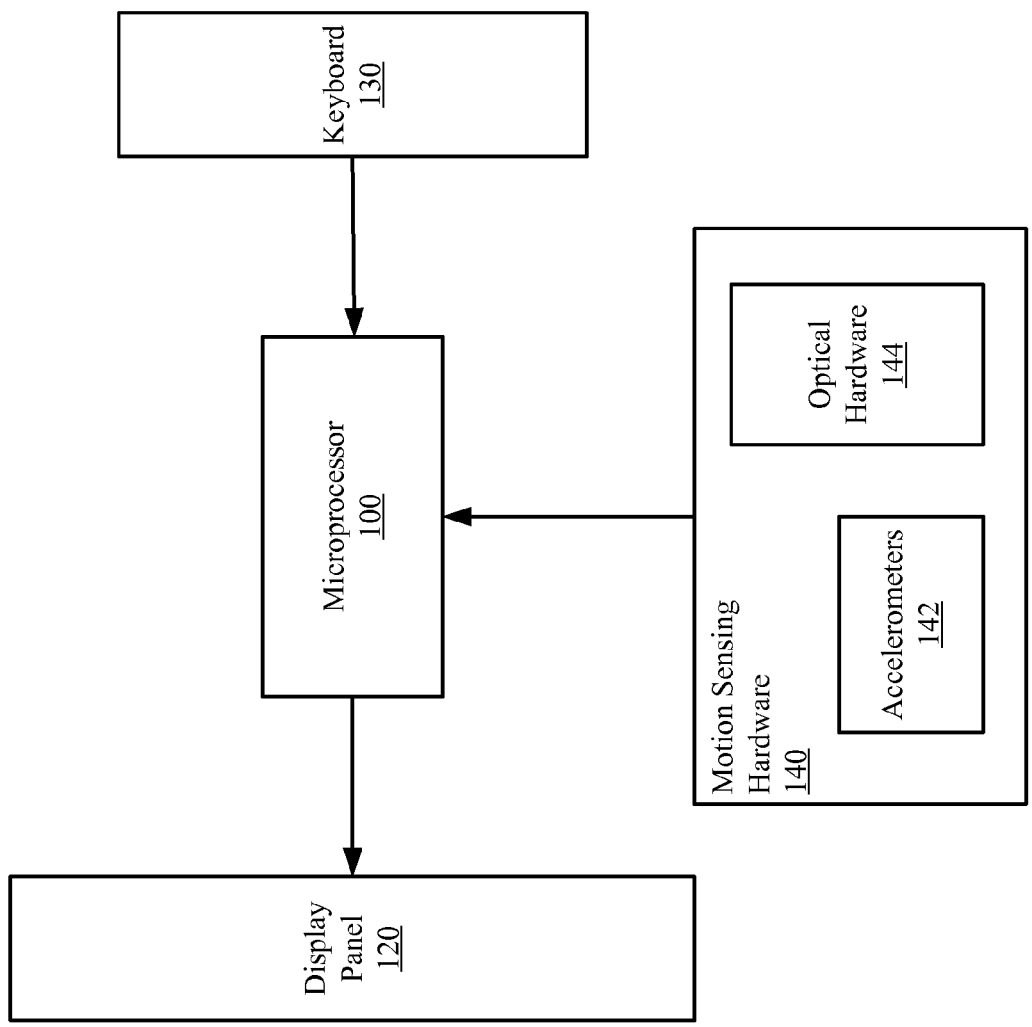
FIG. 4 is a block diagram of the handheld electronic device exemplary architecture.

FIG. 4 is a block diagram of the handheld electronic device exemplary architecture which includes a microprocessor 100 with on-board memory, a display panel 120 such as an LCD in data communication with the processor, and a user-input assembly 130 such as a keyboard or touch-screen in data communication with the processor 100. In addition, the handheld device incorporates one or more motion-sensing devices 140 in data communication with the processor 100 for sensing movement of the handheld electronic device. The motion-sensing devices 140 may include accelerometer(s) 142 that measure the force of gravitation combined with the force of inertia along orthogonal axes, gyroscope(s) to measure changes in tilt, and/or optical hardware 144 which may be a conventional digital camera in combination with software running on the processor 100 that analyzes sequential video frames and approximates relative orientation changes based on the degree of overlap observed in consecutive frames of video. Depending upon which of the above-indicated technologies is selected, the motion-sensing hardware outputs a motion signal indicative of any one or a combination of relative orientation change, absolute orientation with respect to a horizontal plane, and/or linear acceleration along one or more spatial dimensions.

This motion signal is then interpreted by software resident in the processor memory and is used to control magnification of an object being viewed on the display panel. Any of these technologies may be used in combination to complement each other and compensate for the weaknesses and blind spots inherent in each of the other technologies. In particular, the embodiment shown in FIG. 4 employs an optical solution 132 in combination with a three-axis accelerometer 144 to compensate for the accelerometer's inability to measure rotation around the gravity vector, as well as its inability to model simultaneous changes in both position and orientation. The software for this embodiment correlates relative orientation changes over time as determined from the optical solution with force data measured by the accelerometer to generate measurements of orientation with respect to a horizontal plane and inertial acceleration in three dimensions. Specifically, the relative orientation changes over time detected by the optical sensor are compared with the changes in total force measured along three axes by the accelerometer in order to calculate the approximate direction of the gravitational vector. The method assumes a "standard gravity" based on earth nominal gravity at sea level (9.80665 m/s$^2$), or alternatively, assumes a more accurate local gravity which varies by latitude and elevation. The standard (or local) gravitational force vector is subtracted from total force measurements, resulting in independent measurements of the gravitational and inertial forces along three axes. This measurement approach is more accurate than those that could be produced using either the accelerometer hardware or optical sensor hardware independently.

The interpretive software employs a "perspective" calculation based on geometries as will be described In addition to tilting the image in response to tilting the device, the software may also scroll the tilted view of the image in the direction of the tilt. If one imagines the user's display as the viewpoint of a virtual camera hovering over a virtual surface, this perspective scrolling effect would be equivalent to what the virtual camera would see if it were to fly at a fixed height over the virtual surface toward the central point of its field of view. This user interface method has the benefit of increasing the user's control over the display without requiring him to use a different control to see still more of the target image.

The current invention describes two embodiments of this perspective scrolling effect, which differ in the criteria they use for initiating the perspective scrolling effect.

The first embodiment defines a maximum tilt viewing threshold angle, and prevents the display from tilting past this angle. If the user tilts beyond this threshold, and maintains this tilt for a short period of time, the software will initiate and maintain the perspective scrolling effect toward the center point of the user's field of view for as long as the user maintains his tilt beyond the threshold.

The second embodiment of the perspective scrolling effect initiates scrolling before the user reaches the maximum tilt threshold. The velocity of the scrolling effect increases with tilt angle, so the user's view will be stationary when user is looking straight at the image, such that the line of sight to the center his field of view is perpendicular to the image. As the user tilt his device, resulting in a tilted perspective view of the image, the display will start scrolling with a velocity that increases as his tilt angle increases. The result of this effect is that if the user tilts to focus and maintain the center of his field of view on a particular point on the image, the display will gradually re-center his viewpoint over that point, until eventually his line of sight to the point is perpendicular to the image. A software function maps tilt angle to velocity, and this mapping may be linear, but a curved function such as an exponential or geometric mapping will provide a better user experience by giving the user more fine-grained control when viewing parts of the image that are closest to him.

Figure 5:
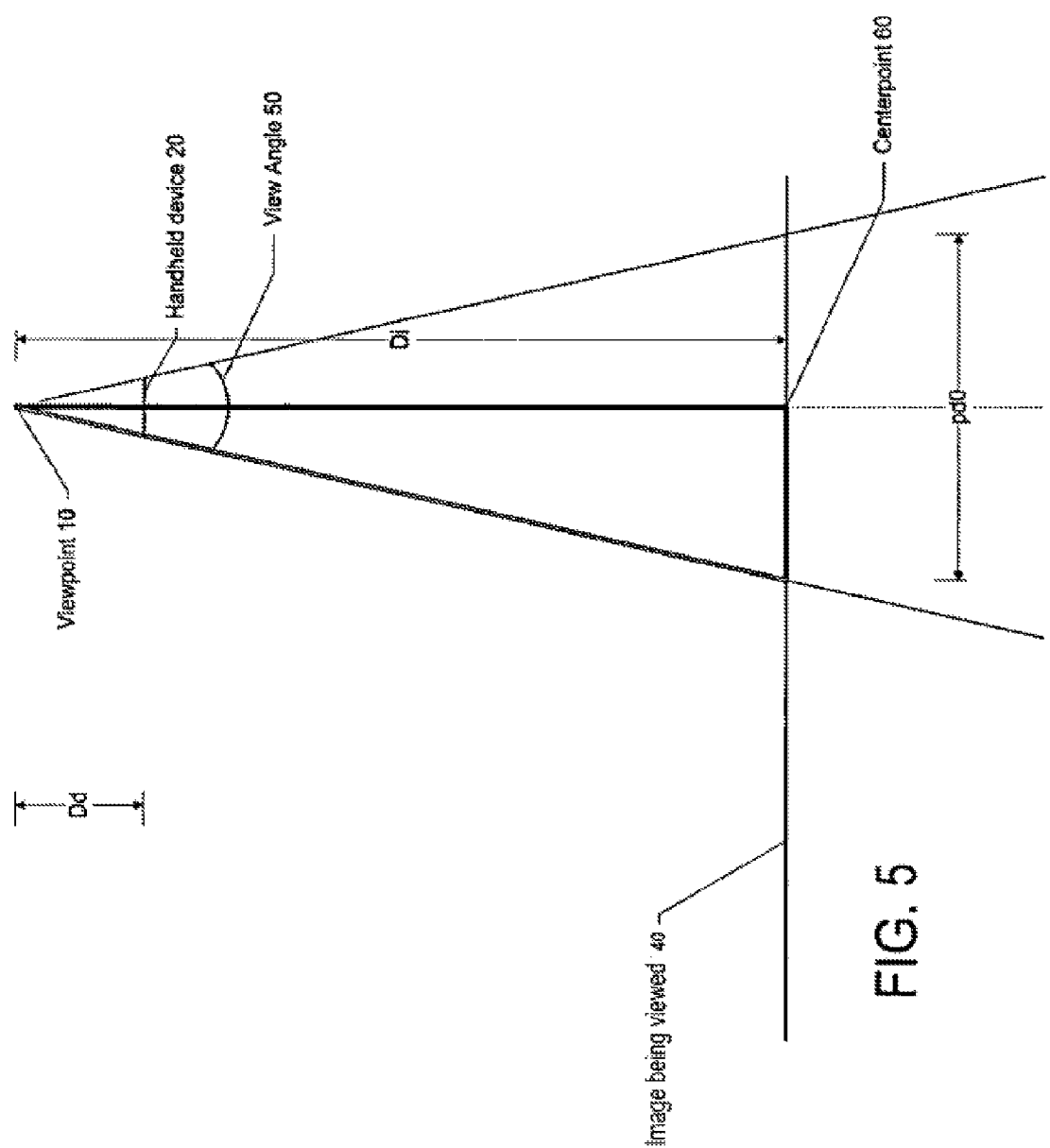
FIG. 5 shows one way of calculating portions of an image to view based on the virtual "distance" to the object from the device and the angle of view on the device, when the view is "head-on" to the image being viewed.
Figure 6:
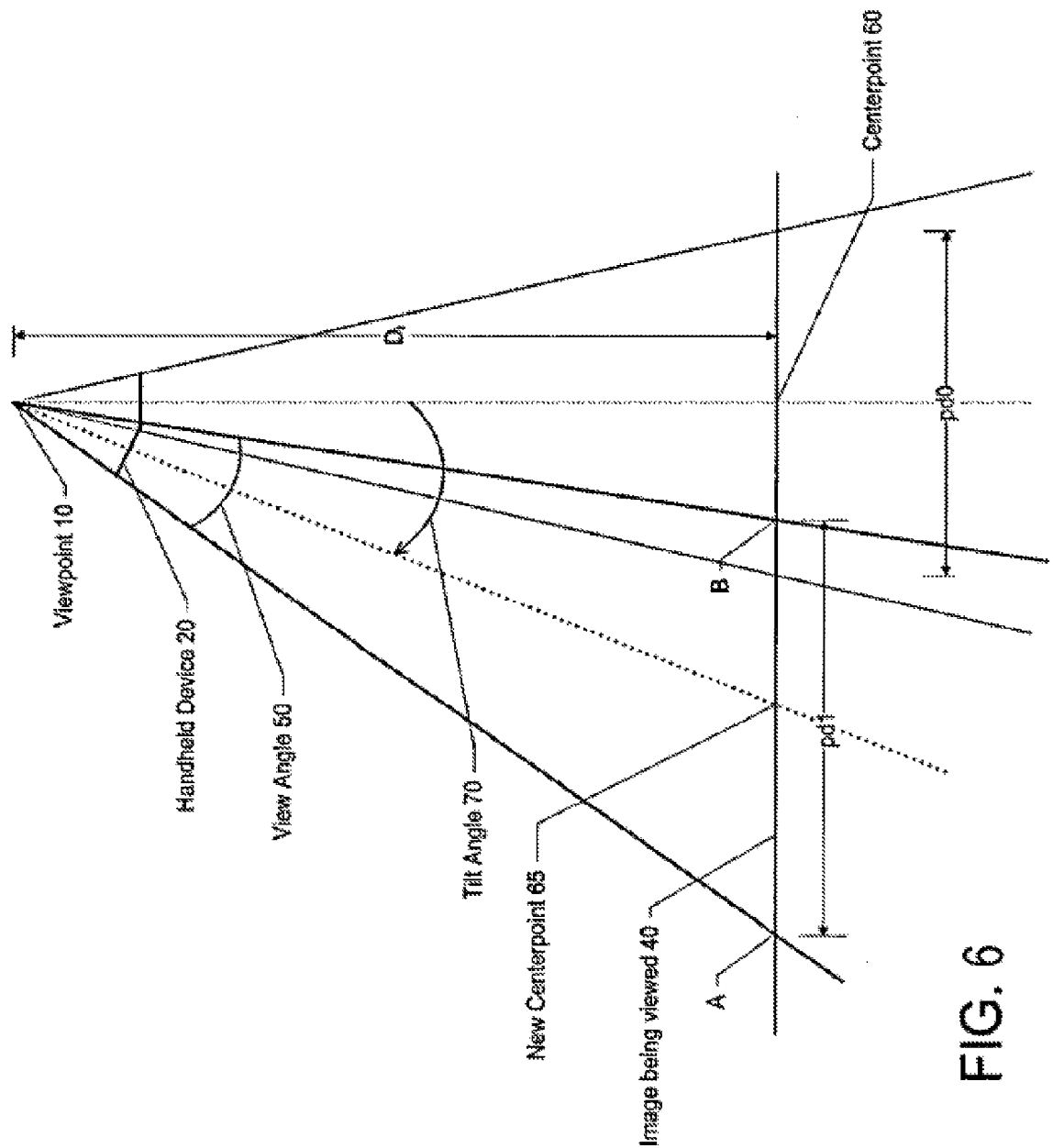
FIG. 6 shows the situation when the user has tilted the display and thereby tilted the view of the image being displayed.

FIGS. 5 and 6 show calculations of what portion of a two-dimensional image are seen on the handheld device display for a given tilt. This view looks down on the handheld device and the image being viewed, so that the 2D viewed object and the handheld device display are looked at from their top edges. In this view we do calculations in one dimension of the plane of the viewed image; we treat this as the X dimension, and calculations for the Y dimension are similar.

We are given:
Dd, the virtual distance from the viewpoint to the handheld device,
the width and height of the device display,
Di, the (virtual) distance from the viewpoint to the image being viewed, and
the "centerpoint" on the viewed image that is directly under the viewpoint, i.e., the point touched by the "normal" line from the viewpoint to the image.

We describe calculations to determine what portion of the image to display in the X dimension of the plane of the viewed image; the next figure describes them in the situation after the view is tilted.

In FIG. 5, the View Angle 50 is defined by Dd, the distance from the viewpoint 10 to the handheld device 20, and by the width of the handheld device display. The View Angle 50 determines how much of the Viewed Image 40 appears on the display. Since Di is at a 90 degree angle to the Viewed Image 40, the viewed portion of the image is evenly spaced around the center point 60.

To calculate pd0:

$$\tan(\tfrac{1}{2}\text{view angle}) = \tfrac{1}{2}pd0/d$$

$$pd0 = 2(\tan(\tfrac{1}{2}\text{view angle})*d)$$

If the centerpoint X coordinate has a value of x1, then the X coordinates for the viewed portion of the image are x1−(pd0/2) and x1+(pd0/2).

FIG. 6 shows the view tilted; this is the effect created by the current invention when the Handheld Device 20 is tilted by Tilt Angle 70. After this tilt, the center of the field of view touches the Image being Viewed 40 at the New Centerpoint 65, and the portion of the Image being Viewed 40 is between the diagram points A and B, covering a distance of pd1.

The angle made by A, the Viewpoint 10, and the Centerpoint 60 is the sum of half the View Angle 50 and the Tilt Angle 70; this is easy to visualize by comparing FIG. 6 to FIG. 5 and realizing that the View Angle 50 line moved from its position in FIG. 5 to its position in FIG. 6 by moving by the tilt angle. Likewise, the angle formed by B, the Viewpoint 10, and the Centerpoint 60 is the sum of half the View Angle 50 and the Tilt Angle 70 (remembering that, in this case, half the View Angle 50 is negative in relation to the Tilt Angle 70). It is therefore easy to calculate the values of points A and B on the Image being Viewed 40.

Note that the distance from A to the New Centerpoint 65 is larger than the distance from the New Centerpoint 65 to B. This difference is reflected in the display of the image being viewed, since those points nearer A look smaller and farther away than the points near B; this is the "perspective view" of the image that is characteristic of the current invention.

Figure 7:
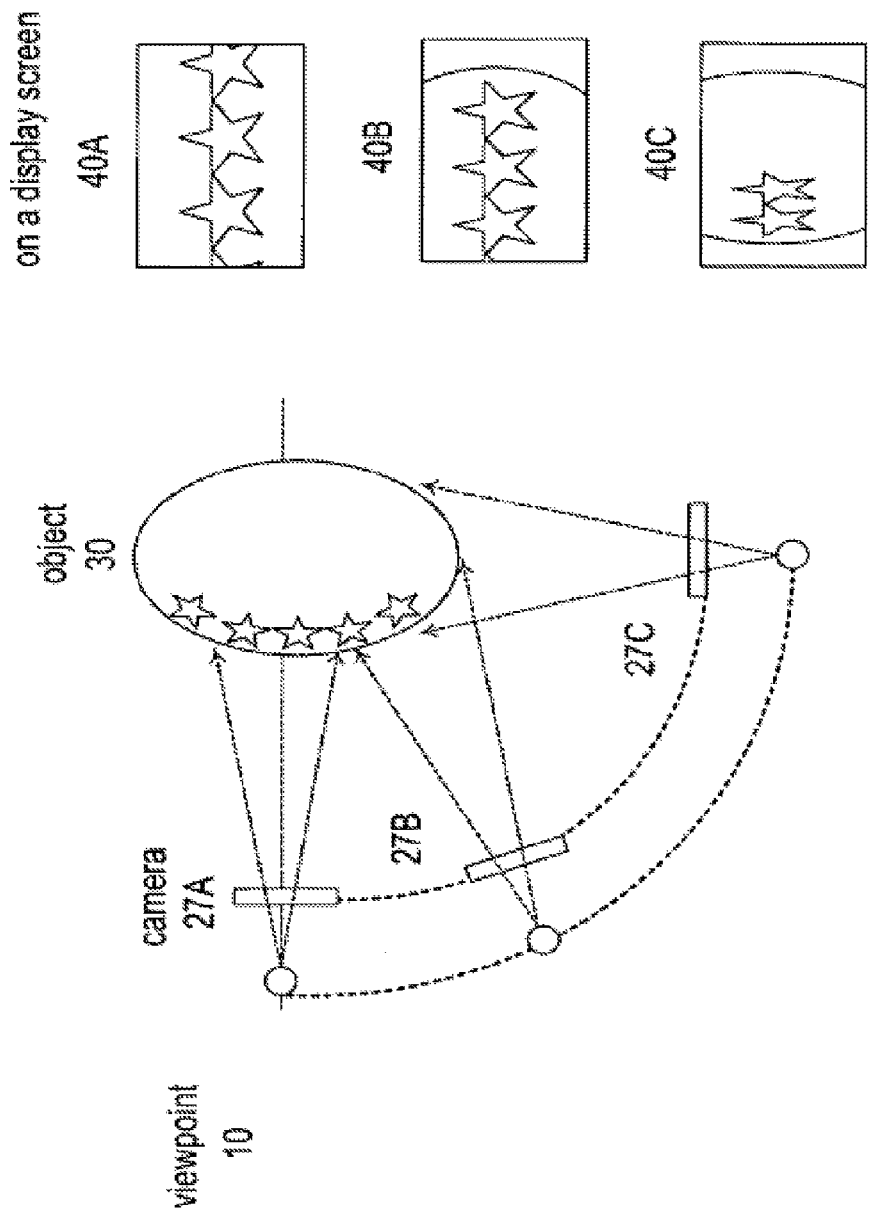
FIG. 7 shows the same two viewpoints as FIG. 3 for the case where the view of the object travels in an arc around the object, allowing the user to see different sides of a three-dimensional object.

FIG. 7 shows the three view points 10 through a camera viewfinder as FIG. 3, for a case where the camera view of the object travels in an arc (27A-C) around the object, allowing the user to see different sides of a three-dimensional object. The left view 27A of FIG. 7 shows the viewpoint for the user, and 27B-C show how it changes as he moves the camera in a circle around the object. The screen representations on the right 40A-C show the view the user might see in the three positions 27A-C shown on the left.

In a manner similar to that for moving a camera, the current invention defines these motions of a hand-held device to cause the virtual object display software to change the object view in a way similar to that of corresponding camera movements. The perceived size and distance from the virtual object may make it difficult to make a circular motion in scale, so the movements are defined such that approximating the movements around the virtual object are scaled down to those that can be made using the arms and hands of a user holding the hand-held device. The user might well perceive this as looking at an extremely detailed, but small, model of the object.

It should now be apparent that the current invention effectively allows a user to use movements of a handheld device such as a cell phone to change the view, change the magnification, or both concurrently, by moving the device. This eliminates the need for separate controls for the scrolling and magnification changes. It also provides a user interface that is more natural than traditional scrolling, by allowing a user to see more of an image at one time, in perspective, and simultaneously allowing control of magnification.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

INDUSTRIAL APPLICABILITY

Electronic devices with display screens have become ubiquitous, including cellular phones and personal digital assistants (PDAs), PC Tablets, as well as laptops, PCs, office equipment, medical equipment, and other hand-held electronic device. Some of these incorporate user interfaces that allow the viewing of documents, pictures, maps, or similar images, and provide various control functions for image manipulation. Most use simple cursor controls to allow scrolling, by which a user can change the portion of image under view but cannot change the magnification or perspective of the image. Such controls are not intuitive. There would be significant industrial applicability in a more intuitive user interface, including motion-sensitive controls that allow a user to see more of an image at one time than traditional scrolling, viewing it in perspective so that he can relate new portions in view with portions that were in view already, and doing so with perspective views with which the user is already familiar. In addition, the motion-sensitive control would simultaneously allow the user to change the magnification of the image using movements that are compatible with the tilt movements.

What is claimed is:

1. A method comprising:
   determining, by a motion-sensing device of a handheld electronic device, orientation changes of the handheld electronic device over time;
   correlating, by said handheld electronic device, the orientation changes with force data measured by an accelerometer to generate measurements of orientation with respect to a horizontal plane and inertial acceleration in three dimensions; and
   based at least in part on the measurements of orientation, controlling, by said handheld electronic device, display of an object on a display panel of the handheld electronic device as a function of motion of said handheld electronic device, said function interpreting motion along a first axis as a first function that affects the display of the object on said display panel, and said function interpreting motion about a second axis distinct from the first axis as a second function that affects the display of the object on said display panel, wherein the first function is different from the second function.

2. The method of claim 1 wherein the orientation changes of the handheld electronic device are determined at least in part by comparing overlap in multiple sequential images captured by at least one optical sensor of the handheld electronic device.

3. The method of claim 2, wherein the accelerometer measures gravitational forces and inertial acceleration along three orthogonal axes to generate the force data and wherein the at least one optical sensor captures the multiple sequential images at known time intervals.

4. The method of claim 1, further comprising:
   decreasing a magnification of the object on said display panel in response to moving the handheld electronic device in a first direction along the first axis, and increasing the magnification of the object on said display panel in response to moving the handheld electronic device in a second direction, opposite the first direction, along the first axis.

5. The method of claim 1, further comprising:
   defining a threshold for a maximum tilt angle; and
   in accordance with a determination that a tilt angle of the handheld electronic device has increased beyond the threshold for the maximum tilt angle, scrolling a display of the object on said display panel.

6. The method of claim 1, further comprising:
   scrolling a display of the object on said display panel with increasing velocity as a tilt angle of said handheld electronic device increases.

7. The method of claim 6, wherein the scrolling of the display of the object on said display panel comprises orbiting around a perspective view of the object.

8. The method of claim 6, further comprising:
while scrolling the display of the object on said display panel, centering a current perspective view of the object on said display panel in response to a user action.

9. The method of claim 8, wherein the user action is a pre-defined motion of the device, a button push, a screen tap, or a voice command.

10. The method of claim 1, wherein the first function comprises a zoom function and wherein the second function comprises a change in perspective function.

11. A handheld electronic device comprising:
a processor;
a display panel in data communication with said processor;
a motion-sensing device in data communication with said processor for sensing movement of the handheld electronic device, the motion-sensing device including an accelerometer;
a memory device coupled to said processor, said memory device including instructions to be executed, wherein said instructions, when executed by said processor, cause said processor to:
determine, by the motion-sensing device, orientation changes of the handheld electronic device over time;
correlate, by said handheld electronic device, the orientation changes with force data measured by the accelerometer to generate measurements of orientation with respect to a horizontal plane and inertial acceleration in three dimensions; and
based at least in part on the measurements of orientation, control, by said handheld electronic device, display of an object on said display panel as a function of motion of said handheld electronic device, said function interpreting motion along a first axis as a first function that affects the display of the object on said display panel, and said function interpreting motion about a second axis distinct from the first axis as a second function that affects the display of the object on said display panel, wherein the first function is different from the second function.

12. The handheld electronic device of claim 11, wherein the handheld electronic device includes at least one optical sensor in data communication with said processor and the orientation changes of the handheld electronic device are determined at least in part by comparing overlap in multiple sequential images captured by the at least one optical sensor.

13. The handheld electronic device of claim 12, wherein the accelerometer measures gravitational forces and inertial acceleration along three orthogonal axes to generate the force data and wherein the at least one optical sensor captures the multiple sequential images at known time intervals.

14. The handheld electronic device of claim 11, wherein the instructions further cause the processor to:
decrease a magnification of the object on said display panel in response to moving the handheld electronic device in a first direction along the first axis, and increase the magnification of the object on said display panel in response to moving the handheld electronic device in a second direction, opposite the first direction, along the first axis.

15. The handheld electronic device of claim 11, wherein the instructions further cause the processor to:
define a threshold for a maximum tilt angle; and
in accordance with a determination that a tilt angle of the handheld electronic device has increased beyond the threshold for the maximum tilt angle, scroll a display of the object on said display panel.

16. The handheld electronic device of claim 11, wherein the instructions further cause the processor to:
scroll a display of the object on said display panel with increasing velocity as a tilt angle of said handheld electronic device increases.

17. The handheld electronic device of claim 16, wherein the scrolling of the display of the object on said display panel comprises orbiting around a perspective view of the object.

18. The handheld electronic device of claim 16, wherein the instructions further cause the processor to:
while scrolling the display of the object on said display panel, center a current perspective view of the object on said display panel in response to a user action.

19. The handheld electronic device of claim 18, wherein the user action is a pre-defined motion of the device, a button push, a screen tap, or a voice command.

20. The handheld electronic device of claim 11, wherein the first function comprises a zoom function and wherein the second function comprises a change in perspective function.

21. A non-transitory memory storing executable instructions that, when executed by an electronic device with a processor, a display panel in data communication with said processor, and a motion-sensing device in data communication with said processor for sensing movement of the handheld electronic device, the motion-sensing device including an accelerometer, cause the handheld electronic device to:
determine, by the motion-sensing device, orientation changes of the handheld electronic device over time;
correlate, by said handheld electronic device, the orientation changes with force data measured by the accelerometer to generate measurements of orientation with respect to a horizontal plane and inertial acceleration in three dimensions; and
based at least in part on the measurements of orientation, control, by said handheld electronic device, display of an object on said display panel as a function of motion of said handheld electronic device, said function interpreting motion along a first axis as a first function that affects the display of the object on said display panel, and said function interpreting motion about a second axis distinct from the first axis as a second function that affects the display of the object on said display panel, wherein the first function is different from the second function.

22. The non-transitory memory of claim 21, wherein the handheld electronic device includes at least one optical sensor in data communication with said processor and the orientation changes of the handheld electronic device are determined at least in part by comparing overlap in multiple sequential images captured by the at least one optical sensor.

23. The non-transitory memory of claim 22, wherein the accelerometer measures gravitational forces and inertial acceleration along three orthogonal axes to generate the force data and wherein the at least one optical sensor captures the multiple sequential images at known time intervals.

24. The non-transitory memory of claim 21, wherein the executable instructions further cause the handheld electronic device to:
decrease a magnification of the object on said display panel in response to moving the handheld electronic device in a first direction along the first axis, and increase the magnification of the object on said display panel in response to moving the handheld electronic device in a second direction, opposite the first direction, along the first axis.

25. The non-transitory memory of claim 21, wherein the executable instructions further cause the handheld electronic device to:
- define a threshold for a maximum tilt angle; and
- in accordance with a determination that a tilt angle of the handheld electronic device has increased beyond the threshold for the maximum tilt angle, scroll a display of the object on said display panel.

26. The non-transitory memory of claim 21, wherein the instructions further cause the handheld electronic device to:
- scroll a display of the object on said display panel with increasing velocity as a tilt angle of said handheld electronic device increases.

27. The non-transitory memory of claim 26, wherein the scrolling of the display of the object on said display panel comprises orbiting around a perspective view of the object.

28. The non-transitory memory of claim 26, wherein the instructions further cause the handheld electronic device to:
- while scrolling the display of the object on said display panel, center a current perspective view of the object on said display panel in response to a user action.

29. The non-transitory memory of claim 28, wherein the user action is a pre-defined motion of the device, a button push, a screen tap, or a voice command.

30. The non-transitory memory of claim 21, wherein the first function comprises a zoom function and wherein the second function comprises a change in perspective function.

\* \* \* \* \*